Nov. 20, 1928.
W. L. SCHELLENBACH
1,692,705
CLUTCH ACTUATING MEANS FOR MACHINE TOOLS
Filed March 3, 1927  2 Sheets-Sheet 1
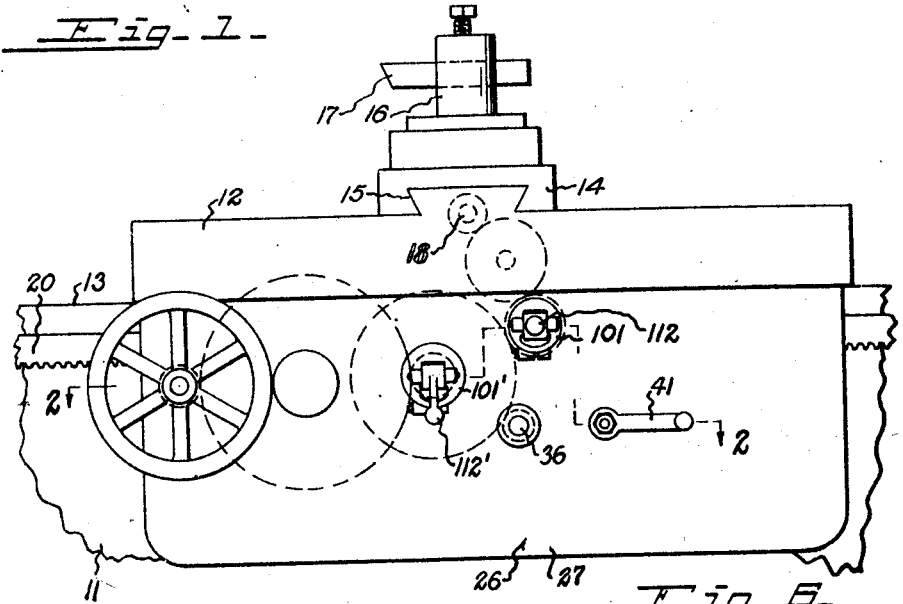
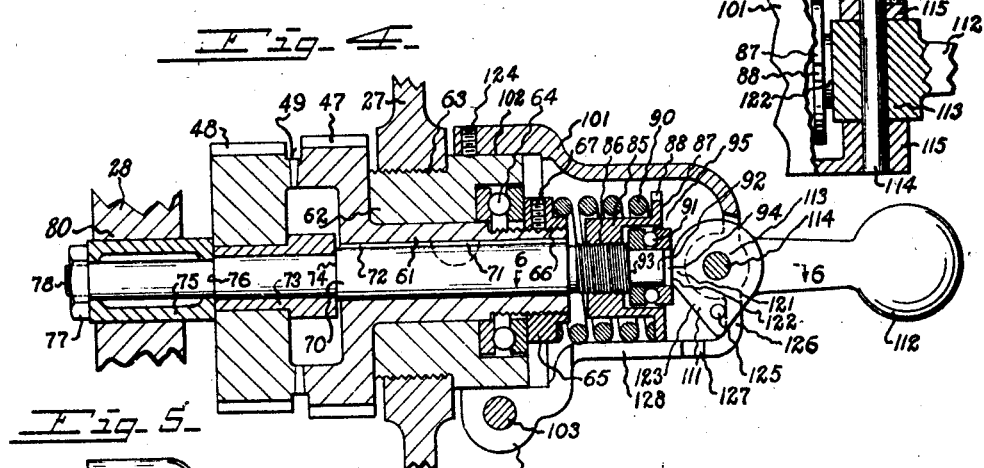
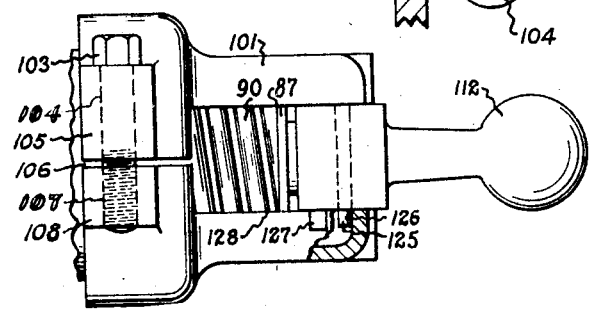
INVENTOR.

Nov. 20, 1928.　　　　　　　　　　　　　　　　1,692,705
W. L. SCHELLENBACH
CLUTCH ACTUATING MEANS FOR MACHINE TOOLS
Filed March 3, 1927　　　2 Sheets-Sheet 2
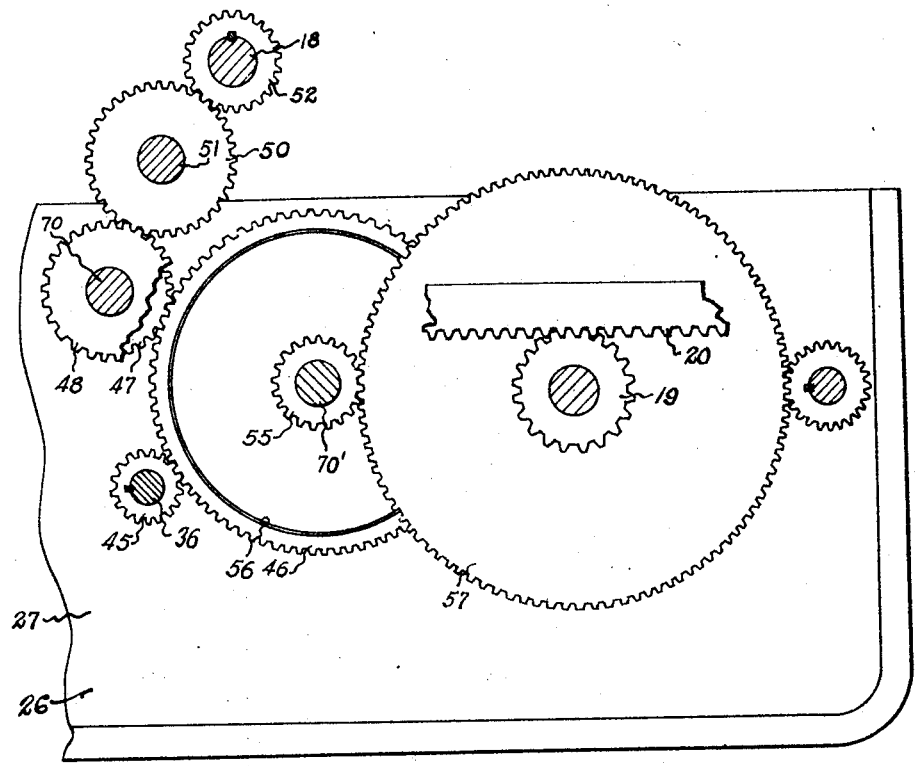
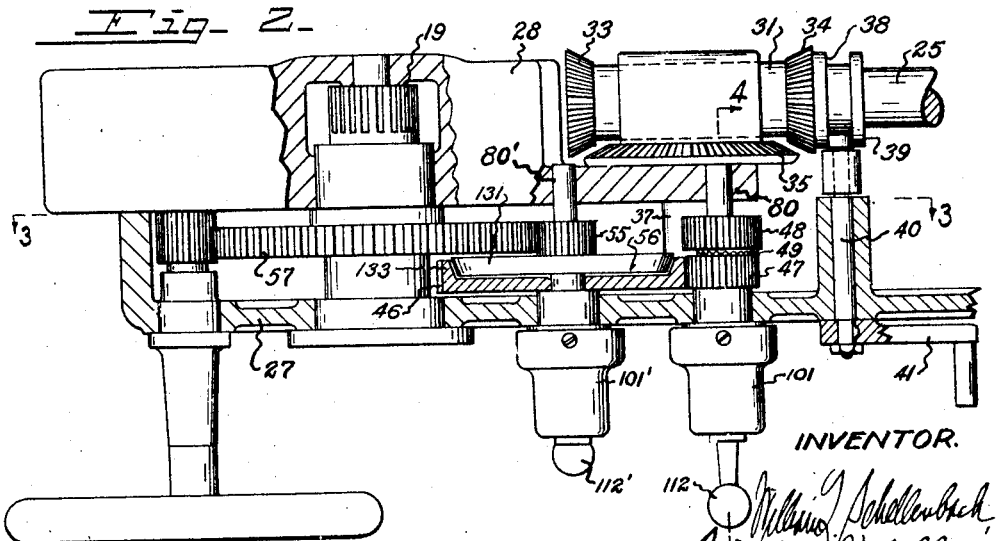
INVENTOR.

Patented Nov. 20, 1928.

1,692,705

UNITED STATES PATENT OFFICE.

WILLIAM L. SCHELLENBACH, OF WYOMING, OHIO, ASSIGNOR TO THE AMERICAN TOOL WORKS COMPANY, OF CINCINNATI, OHIO, A CORPORATION OF OHIO.

CLUTCH-ACTUATING MEANS FOR MACHINE TOOLS.

Application filed March 3, 1927. Serial No. 172,404.

The present invention relates to clutch actuating means for machine tools, and is shown employed for actuating clutches in a lathe apron concerned in the feeding movements of the tool-holder.

In machines of this character it has been usual to clutch and unclutch the clutch by means of a hand-wheel, usually of star form, and serving as a nut or bolt to draw the clutch elements together or to separate the same. It has been found in practice that sufficient clamping force cannot be exerted conveniently by mechanism of this character, especially when the feeding movement of the tool is resisted by great forces required in modern machine tool practice for taking heavy cuts, and under the modern practice of high cutting speeds, and it has also been found that release of the clutches by such means has also been difficult and inaccurate for definite limits of cutting movements, due, in part, to the fact that such hand-wheels turn during the feeding movements of the tool, making it difficult to properly grasp and to turn the same in clamping and in unclamping directions.

It is the object of the present invention to provide simple means capable of exerting great power for operating a clutch; further, to provide such means with a control part which is relatively stationarily positioned; further, to provide improved clutching means wherein the clutch is normally in clutching relation, and a hand-lever normally stationary on its support and pivoted in such manner that the operator may conveniently exert great power for changing the clutch relations, and, further, to provide novel means whereby a cam-operating lever may be independently mounted in coactive relation with the clutch actuating part.

The invention will be further readily understood from the following description and claims, and from the drawings, in which latter:

Fig. 1 is a front elevation of an exemplifying lathe, partly broken away, and having the present invention applied thereto.

Fig. 2 is a plan view of the same, partly in section on the irregular line 2—2 of Fig. 1, and partly broken away, for illustrating the apron mechanism.

Fig. 3 is a rear elevation of the same, partly broken away, and partly in section in the plane of the line 3—3 of Fig. 2.

Fig. 4 is an axial section of the clutching means, taken in the plane of the line 4—4 of Fig. 2.

Fig. 5 is a bottom view detail of the clutch operating means, partly broken away; and, Fig. 6 is a cross-section of the same, taken in the plane of the line 6—6 of Fig. 4.

The exemplified lathe comprises a usual bed 11, on which a carriage 12 is arranged to be fed lengthwise of the bed on guideways 13, the carriage supporting a usual cross-slide 14, slidable crosswise of the carriage on guideways 15, and supporting a tool-holder 16, in which a usual tool 17 is arranged to be suitably secured in usual manner. The tool-holder is fed crosswise of the carriage by suitable means, as by means of a usual cross feed-screw 18, and lengthwise of the bed, as by means of a suitable feeding pinion 19 rotatable on the carriage and meshing with a rack 20 extending lengthwise of the bed and fixed to the bed in usual manner.

A usual feed-rod 25 extends lengthwise of the bed, is suitably journaled therein, and is suitably driven at selective speeds in any well-known manner. The apron 26 depends from the carriage in front of the bed and is suitably fixed to the carriage. The apron is exemplified as comprising an outer wall 27 and as provided with an inner wall 28. The feed-rod is provided with a sleeve 31, which has suitable spline groove and key connection with the feed-rod being rotated thereby. This sleeve has bevel pinions 33, 34, fixed thereto, arranged for coaction with the bevel gear 35 fixed to a shaft 36 journaled in a bearing 37 in the apron. The sleeve is provided with an annular groove 38 in which a fork 39 is received, the fork being fixed to a rock-shaft 40 operated by a crank-handle 41 in usual manner for placing the bevel pinions in neutral position with relation to the bevel gear, or for meshing either bevel pinion with said bevel gear for reverse rotations of said bevel gear in well-known manner, for providing driving means for the apron mechanism, or such driving means may assume such other usual form as may be desired.

A pinion 45 is fixed to the shaft 36. It meshes with a gear 46, which in turn meshes with a gear 47. The gear 47 has a gear 48 complemental thereto. A clutch 49, shown as a tooth clutch, is arranged between said gears 47 and 48. The gear 48 meshes with a gear 50 rotating with a shaft 51 journaled in the apron. The gear 50 meshes with a pinion 52 which is on the cross-feed screw 18, for rotating said cross-feed screw in either direction.

The gear 46 has a pinion 55 complemental therewith, a clutch 56, shown as a friction clutch, being arranged between said pinion and said gear. The pinion 55 meshes with a gear 57, which has the rack pinion 19 rotatable therewith.

The gear 47 is provided with a hub 61 journaled in a bearing-piece 62 secured to the front wall of the apron, as by having threaded connection 63 therewith. An end-thrust bearing 64, shown as a ball bearing, is received about the hub 61. A collar 65 has threaded connection 66 with the hub, and is arranged to bear upon the outer raceway of the end-thrust ball-bearing 64, for positioning the hub endwise in its bearing. The collar is arranged to be locked in adjusted positions by a set screw 67.

A shaft 70 is located in said gear 47, the said gear and said shaft being rotatively connected by means of a key 71 in said shaft received in a groove 72 in said gear. The shaft is movable endwise in said gear.

The shaft 70 is received through the gear 48 and is rotatable in said gear. The gear is positioned in endwise relation to the shaft, as by being provided with a bushing 73, fixed in said gear, the end of which is arranged to bear upon an annular shoulder 74 on said shaft. A bearing bushing 75 is received about said shaft and is held endwise with relation thereto by an annular shoulder 76 on said shaft and a nut 77 threaded over the reduced threaded end 78 of said shaft. The gear 48 is rotatable with relation to said shaft, and is held endwise to said shaft between the annular shoulder 74 which coacts with the gear bushing 73, and by the annular shoulder 76, with which the bearing bushing 75 coacts.

The bearing bushing 75 is rotatable in and movable lengthwise in a bearing 80 in the rear wall of the apron.

A collar 85 has threaded connection 86 with the forward end of the shaft 70, forming a nut about said shaft, provided with an annular radially extending flange 87 provided with suitable turning means, as recesses 88 for a suitable spanner wrench. A spring 90 is received about the forward end of the shaft between the collar 65 and the collar 85, the spring being received about the hubs of said collars, the respective ends of the spring coacting with the annular flanges on said respective collars.

An end-thrust bearing 91 is provided for the forward end of the shaft, being shown as a ball-bearing received about the reduced forward end 92 of said shaft. The inward movement of said ball-bearing is limited by an annular shoulder 93 on said shaft, and the outer end of the outer raceway preferably extends outwardly beyond the end of said shaft, as shown by the recess 94, and beyond the outer end of the collar 85, as shown by the space 95.

A housing 101 is received about said spring and the outer end of the shaft 70, and is arranged to be secured to the apron, as by having a bearing 102 received about the bearing thimble 62 extending outwardly from said apron. The bearing 102 is shown as a split-bearing, arranged to be clamped about said bearing-thimble, as by means of a clamp bolt 103 received through a bore 104 of a lug 105 at one side of the split 106 of said bearing, and threaded into a threaded hole 107 of a lug 108 at the other side of said split.

A cam 111 is shown on a lever 112, pivoted to said housing, as by being provided with a bearing 113 about a pivot pin 114, fixed in bearing lugs 115 in the outer end of said housing, the pivot pin being secured in said bearing lugs by a set-screw 116. This cam coacts with the end thrust bearing 91 at the outer end of the shaft 70, and is shown bearing against the outer raceway of said end-thrust bearing.

In the form shown, the clutch is normally engaged by the action of the spring 90. The low part 121 of the cam is provided with a flat face 122 for holding the cam lever in clutched relation, shown as a forwardly extending position of said cam lever. The cam is provided with a high point 123 arranged to coact with the end-thrust bearing at the forward end of the shaft 70 during unclutched relation in the clutch, the cam lever being swung on its pivot for coaction of the high point of the cam with said end-thrust bearing.

The cam lever is stationary on its support during unclutched relation and during clutched relation of the clutch. The position of the housing is adjustable about the axis of the shaft 70, so that movement of the cam lever for clutching relation and for unclutching relation may be in any desired direction. An up and down relation of the lever is, however, preferred, and the housing may be held in this position, or in any other desired position, by the clamping force of the split bearing upon its support. If desired, a set-screw 124 may be employed for additionally fixing such relation.

The high point of the cam is also preferably provided with a flat face for maintaining the cam lever in actuated relation during coaction between said high point of the cam and the end-thrust bearing of the shaft. The cam lever may be provided with a pin 125 coacting with an end wall portion 126 of the housing for limiting swinging movement of the cam lever. In assembling the parts, the pin is received through a notch 127 in the wall of a slot 128 in the housing. The hub of the lever is received in said slot.

The clutch is normally in engaged relation by the action of the spring 90. If it is desired to unclutch the clutch, the lever is swung for coaction of the high point of the cam with the end thrust bearing 91 of the shaft, whereby the shaft 70 is moved endwise against the resistance of the spring 90, the shaft moving endwise in the gear 47, which is held stationary endwise, the shaft, however, carrying the gear 48 with it in its endwise movement for disengaging the clutch. The bearing bushing 75 is also moved endwise in its bearing by such endwise movement of the shaft.

If it is desired to again engage the clutch, the lever is moved in the opposite direction, whereby the low part of the cam is placed in complemental relation to the end-thrust bearing 91, and the spring 90 exerts endwise force upon the shaft for again engaging the clutch.

The path of the operating end of the lever is, however, a fixed path, so that the operator may readily grasp the handle and move the same and cause instant engagement or release relation in the clutch, the lever being further normally relatively stationary with relation to the apron.

The clutch 49 is shown as a tooth clutch. The clutch between the gears 46 and the pinion 55 is shown as a friction clutch 56. This friction clutch is shown as a cone clutch, the cone portion of the clutch being shown on a disk 131 fixed to the pinion 55. The recess portion of the clutch is shown received in an annular flange 133 of the gear 46. The other parts of the clutch and the operating means are similar to the parts shown in connection with the clutch 49, and are identified by similar reference numerals provided with the exponent prime.

My improved device is simple and very effective, is arranged for transmitting great power, and is provided with an operating handle whose path is fixed, which, if desired, may be adjusted, and the operating handle is normally stationary and is within convenient reach of the operator.

The parts are also arranged for being readily assembled and dismantled and for inclosing the operating parts for preventing the accumulation of dust or dirt and for protecting the same.

Having thus fully described my invention, what I claim as new, and desire to secure by Letters Patent, is:

1. The combination, in a lathe, of a tool-holder, a lathe apron, and means on said lathe apron for feeding said tool-holder comprising a driving member journaled and held endwise in said lathe apron, a shaft slidable endwise in and held rotatively to said driving member, a driven member at one side of said driving member held endwise to said shaft, said shaft rotatable in said driven member, a clutch between said members, a spring about said shaft at the other side of said driving member, means on said shaft for adjusting the tension of said spring, an end-thrust bearing for said shaft, a housing on said apron about said spring and end-thrust bearing, means securing said housing to said apron independent of support by said shaft, and a cam lever pivoted to said housing and arranged for coaction with said end-thrust bearing.

2. The combination, in a lathe, of a tool-holder, a lathe apron comprising an inner wall and an outer wall, a driving gear between said walls, said driving gear provided with a hub, a bearing in said outer wall for said hub, means for holding said hub in said bearing in axial direction, a shaft movable endwise in said hub, means continuously rotatively connecting said driving gear and said shaft, a driven gear between said walls rotatively loose about said shaft for feeding said tool-holder, a bearing in said rear wall for said shaft, a clutch between said gears, a spring about the outer end of said shaft urging endwise movement of said shaft in one direction for clutched relation in said clutch, a housing on said outer wall about said spring, means detachably securing said housing to said outer wall independent of support by said shaft, and a cam lever pivoted to said housing independent of support by said shaft and arranged for endwise movement of said shaft in the opposite direction for unclutched relation in said clutch.

3. The combination, in a lathe, of a tool-holder, a lathe apron comprising an inner wall and an outer wall, a driving gear and a driven gear between said walls, a clutch between said gears, said driven gear arranged for feeding said tool-holder, said driving gear provided with a hub, a bearing in said outer wall for said hub, a shaft movable endwise in said hub extending outwardly of said outer wall, means rotatively connecting said driving gear and said shaft, an end-thrust bearing and a collar about said hub, a collar adjustable on the outer end of said shaft, a spring between said collars urging movement in one direction in said clutch, an end-thrust bearing for the outer end of said shaft, a housing about said spring and said last-named end-thrust bearing and a cam lever pivoted to said housing for coaction with said last-named end-thrust bearing for urging movement in the opposite direction in said clutch.

4. In mechanism of the character described, the combination of a pair of clutch elements, a shaft slidable endwise in and having rotative connection with one of said elements, the other of said elements having endwise connection with and rotative with relation to said shaft, a supporting part, said shaft extending endwise outwardly from said supporting part, a collar about said one of said elements, a collar about said shaft, a spring between said collars for urging endwise movement in one direction of said shaft, an end-thrust member for said shaft, a housing about said spring and said end-thrust member, a cam lever pivoted to said housing, and means for releasably securing said housing to said supporting part for placing said cam lever in coactive relation with said end-thrust member.

In testimony whereof, I have hereunto signed my name.

WILLIAM L. SCHELLENBACH.